United States Patent
Gottwald et al.

(10) Patent No.: US 6,693,581 B2
(45) Date of Patent: Feb. 17, 2004

(54) DEVICE FOR TRANSMITTING DATA IN A MOTOR VEHICLE

(75) Inventors: Frank Gottwald, Rutesheim (DE); Klaus Voigtlaender, Wangen (DE); Slava Tihovsky, Stuttgart (DE); Stefan Gaier, Stuttgart (DE); Elmar Giehler, Stuttgart Hausen (DE); Peter Crowhurst, Melbourne Victoria (AU)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/203,528
(22) PCT Filed: Jan. 31, 2001
(86) PCT No.: PCT/DE01/00360
§ 371 (c)(1), (2), (4) Date: Dec. 13, 2002
(87) PCT Pub. No.: WO01/59475
PCT Pub. Date: Aug. 16, 2001

(65) Prior Publication Data
US 2003/0142004 A1 Jul. 31, 2003

(30) Foreign Application Priority Data
Feb. 9, 2000 (DE) .......................................... 100 05 558

(51) Int. Cl.$^7$ ................ G01S 13/08; G01S 13/74; G01S 13/88; G01S 13/93
(52) U.S. Cl. .................. 342/70; 342/27; 342/42; 342/43; 342/50; 342/60; 342/118; 342/125
(58) Field of Search ............... 342/42–51, 59, 342/60, 61, 70, 71, 72, 89–103, 175, 195, 27, 28, 118–146

(56) References Cited

U.S. PATENT DOCUMENTS

| | | | |
|---|---|---|---|
| 4,249,176 A | | 2/1981 | Oishi et al. |
| 4,725,841 A | * | 2/1988 | Nysen et al. .................. 342/44 |
| 4,757,315 A | * | 7/1988 | Lichtenberg et al. ......... 342/43 |
| 4,764,769 A | * | 8/1988 | Hayworth et al. ............ 342/50 |

OTHER PUBLICATIONS

Motoki Hirano, Mikio Takeuchi and Takahisa Tomoda, "Keyless Entry System with Radio Card Transponter", IEEE Transactions on Industry Electronics, vol. 35, No. 2, May 1998, pp. 208–216.

* cited by examiner

Primary Examiner—Bernarr E. Gregory
(74) Attorney, Agent, or Firm—Kenyon & Kenyon

(57) ABSTRACT

A device for data transmission in a motor vehicle and/or from a motor vehicle in its vicinity includes a first transceiver unit in or on the motor vehicle and a second transceiver unit, which is provided in at least one transponder unit whose spatial position relative to the vehicle may be variable or any desired position. In the first transceiver unit is a radar unit equipped for distance measurement, expanded by adding a two-channel data transmission system. The second transceiver unit is also a two-channel data transmission unit, and the microwave frequencies for two-channel communication of the data transmission system are selected so that their difference yields an intermediate frequency which is processable using conventional components in a heterodyne receiver in the reception part of each of the first and second transceiver units.

20 Claims, 4 Drawing Sheets

| Field Polarization / Antenna | vertical ↑ | horizontal → | Circular Clockwise ↻ | Circular Counter Clockwise ↺ |
|---|---|---|---|---|
| vertical ↑ | 0dB | ∞ | 3dB | 3dB |
| horizontal → | ∞ | 0dB | 3dB | 3dB |
| Circular Clockwise ↻ | 3dB | 3dB | 0dB | ∞ |
| Circular Counter Clockwise ↺ | 3dB | 3dB | ∞ | 0dB |

DEVICE FOR TRANSMITTING DATA IN A MOTOR VEHICLE

FIELD OF THE INVENTION

The present invention relates to a device for data transmission in a motor vehicle and/or from a motor vehicle in its vicinity, including a first transceiver unit in or on the motor vehicle and a second transceiver unit which is provided in at least one transponder unit whose spatial position relative to the vehicle may be variable or any desired position.

BACKGROUND INFORMATION

Such a device is discussed in IEEE Transactions on Industrial Electronics, Vol. 35, No. 2, May 1988 under the title "Keyless entry system with radio card transponder." This data transmission device transmits a coded query sequence via an induction loop mounted on the vehicle, e.g., in an exterior mirror or in the bumper, to a transponder accommodated in a card the size of a credit card, which then delivers a response sequence via an antenna. The transmission frequencies used here are in the range of a few hundred kHz.

In general, the mechanical keys customary in the past are currently increasingly being replaced by electronic systems such as remote control systems using infrared or wireless signals for access authorization to vehicles. In other words, electronically encoded keys are being used to an increasing extent for startup authorization.

Communication systems between vehicles and an infrastructure installation, e.g., for acquisition of road use fees, are also referred to in other prior systems.

Also referred to in other prior systems are radar distance measuring systems which are installed in the vehicle and operate in the gigahertz range and a radar sensor on at least one side of the vehicle for measuring the distance and velocity between the vehicle and an obstacle, e.g., a vehicle driving in front or a parked vehicle.

SUMMARY OF THE INVENTION

It is an object of the present invention to utilize in a simple manner a radar transmission channel, which is present in the vehicle for distance measurement, for other data transmission functions which are activated only in conjunction with a data exchange which is deemed valid. Firstly, this should reduce costs in manufacturing these systems in comparison with previous separate radar and data transmission systems, and secondly, the security of the transmission between the vehicle and one or more transponders should increase.

Therefore, in order to achieve the object formulated above, a wireless connection is established between the vehicle and at least one transponder. A particular simplification combined with a simultaneous increase in security is achieved due to the fact that each transceiver unit includes a two-channel data transmission unit whose microwave frequencies for two-channel communication are selected so that their difference yields an intermediate frequency which is processable by using conventional components in a heterodyne receiver of the receiving part of the first and second transceiver.

The orientation of the transmitting and receiving antennas relative to one another is problematical because the spatial position of the transponder, in particular, the key (i.e. key fob) to the vehicle is variable as desired. For example, the key may be in the driver's pants pocket.

If a linearly polarized antenna is used in the vehicle sensor and a circularly polarized antenna is used in the transponder to achieve this goal, this avoids the case of two linearly polarized antennas which would produce a theoretically infinitely high attenuation of the transmitted signal if their polarization directions were at right angles.

Furthermore, one or more antennas having the most spherical, i.e., omnidirectional characteristic should be used in the transponder (key).

The radar sensor of the vehicle used for measuring distance and velocity is expanded by adding a two-channel data transmission system which may be used for local communication with a key for "keyless entry" applications and also for communication with an installation for acquisition of fees, for telematic applications or other remote control applications.

The two transceivers are configured so that their oscillator signal (LO signal) is used for downmixing in the case of reception. The transmission frequency and the receiving frequency are such that the band limits of the frequency band used may be upheld due to the their frequency shift. Therefore, frequency stabilization need be used on only one side, i.e., on the motor vehicle side or on the transponder side. Therefore, and due to the fact that conventional components may be used, the entire data transmission system may be implemented inexpensively.

The exemplary data transmission device according to the present invention is explained in greater detail below on the basis of the enclosed drawing using exemplary embodiments.

DETAILED DESCRIPTION

Figure 1:
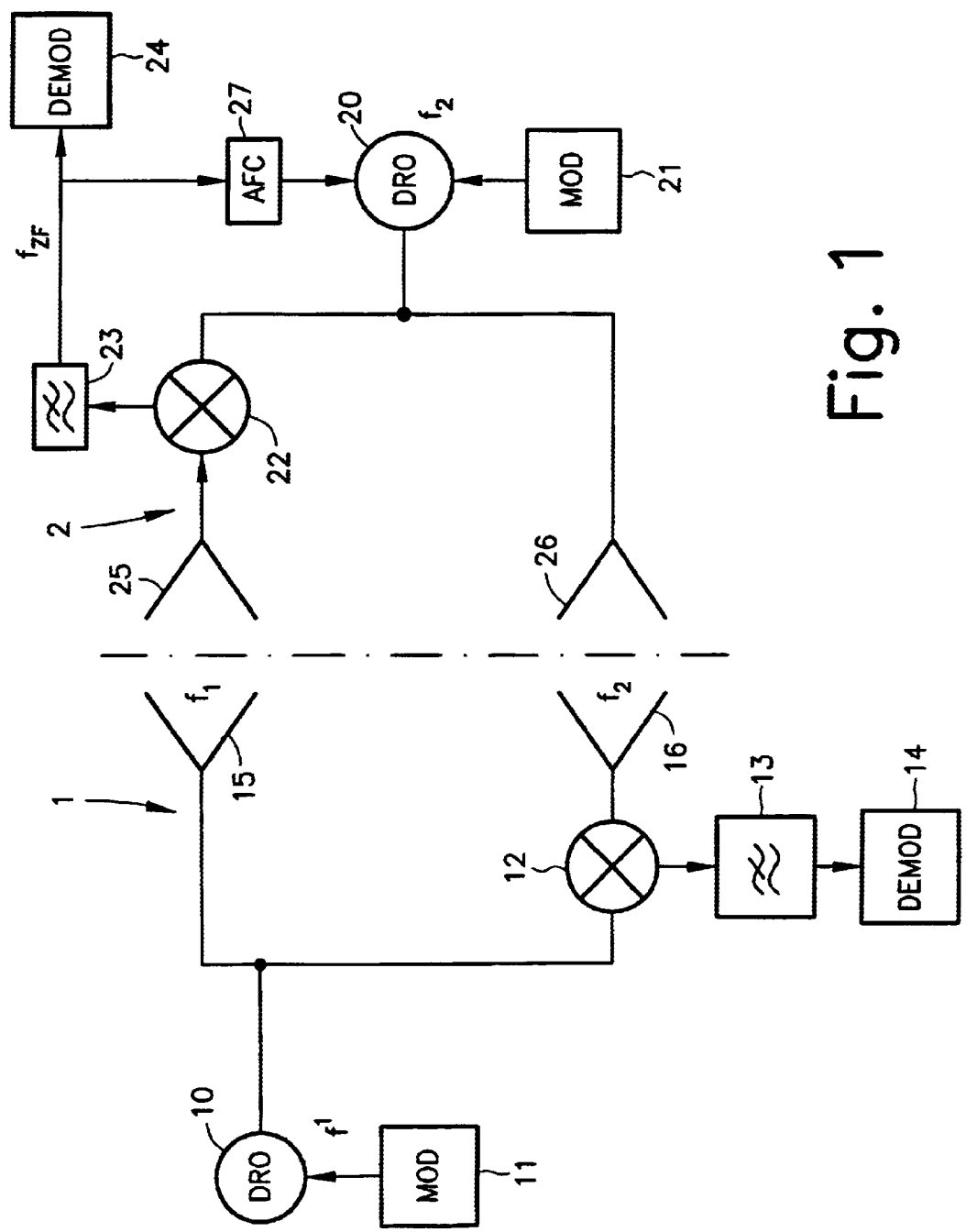
FIG. 1 shows in the form of a block diagram a first exemplary embodiment of the data transmission device according to the present invention in which the transponder side includes an AFC circuit which pulls the frequency of an oscillator, which may be a dielectric resonant oscillator (DRO) for example, so that the intermediate frequency is kept constant.

FIG. 1 shows a first exemplary embodiment of a two-channel data transmission device according to the present invention in the form of a block diagram. On the left side of a vertical line indicated with a dash-dot line, the vehicle side including a first transceiver unit 1 is illustrated, and on the right side of the dash-dot line the transponder side including a second transceiver unit 2 is shown. First transceiver unit 1 in or on the vehicle includes a dielectric resonant oscillator (DRO) 10 whose oscillator frequency $f_1$ (first frequency) is modulated by a transmission modulator 11 using a coded sequence, e.g., in the form of an ASK (amplitude shift keying) modulation. Instead of this, an FSK (frequency shift keying) or PSK (phase shift keying) modulation may be used. In the receiving branch there is a heterodyne receiver including a mixer 12, a low-pass filter 13 and a demodulator 14. A first antenna 15 of first transceiver unit 1 is a transmitting antenna 15 which transmits a signal having frequency $f_1$. A second antenna 16 is a receiving antenna which receives a signal having frequency $f_2$ from the transponder. Mixer 12 mixes the received signal having frequency $f_2$ with transmission frequency $f_1$ of DRO 10, and intermediate frequency $f_{IF}$ is formed from difference $|f_1-f_2|$ after low-pass filtering 13. The reception signal in intermediate frequency position $f_{IF}$ is then demodulated by demodulator 14. The two frequencies $f_1$ and $f_2$ are selected so that their difference $|f_1-f_2|$, i.e., intermediate frequency $f_{IF}$, may be processed with inexpensive conventional standard components.

Due to the conventional and inexpensive implementation of the microwave oscillator with a dielectric resonator (DR), there is a certain frequency drift without stabilization measures. For this reason, a safety margin from the band limits is selected for the transmission/receiving frequencies and this yields a certain frequency shift and thus an intermediate frequency $f_{IF}$.

On the transponder side, the transmitting branch of second transceiver unit 2 also includes a dielectric resonant oscillator DRO 20 and a modulator 21 which modulates it. Transmission frequency $f_2$ generated by DRO 20 and modulated by modulator 21 is sent over a power splitter to transmitting antenna 26 of second transceiver unit 2. The reception part of second transceiver unit 2 includes a heterodyne receiver which in turn includes a mixer 22, a low-pass filter 23 and a demodulator 24. Frequency $f_2$ of DRO 20 is downmixed in mixer 22 with modulated signal $f_1$ received by first transceiver unit 1, forming intermediate frequency $f_{IF}=|f_1-f_2|$ which is demodulated in demodulator 24 after low-pass filtering in low-pass filter 23.

The converse case, i.e., when the transmitting branch in second transceiver unit 2 transmits and the receiving branch in the first transceiver unit receives on the vehicle side, functions in the same manner. Full duplex operation is thus allowed, each of the two transceiver units 1 and 2 are active.

The only difference between the two transceiver units is that one contains the frequency regulation so that the frequency shift caused by using DROs is compensated, and the intermediate frequency is kept constant. In the exemplary embodiment in FIG. 1, second transceiver unit 2 includes an AFC circuit 27 on the transponder side, "pulling" frequency $f_2$ of DRO 20, so that intermediate frequency $f_{IF}$ is kept constant. Therefore, DRO 20 of second transceiver unit 2 conforms to the frequency drift of first DRO 10 on the vehicle side.

Figure 2:
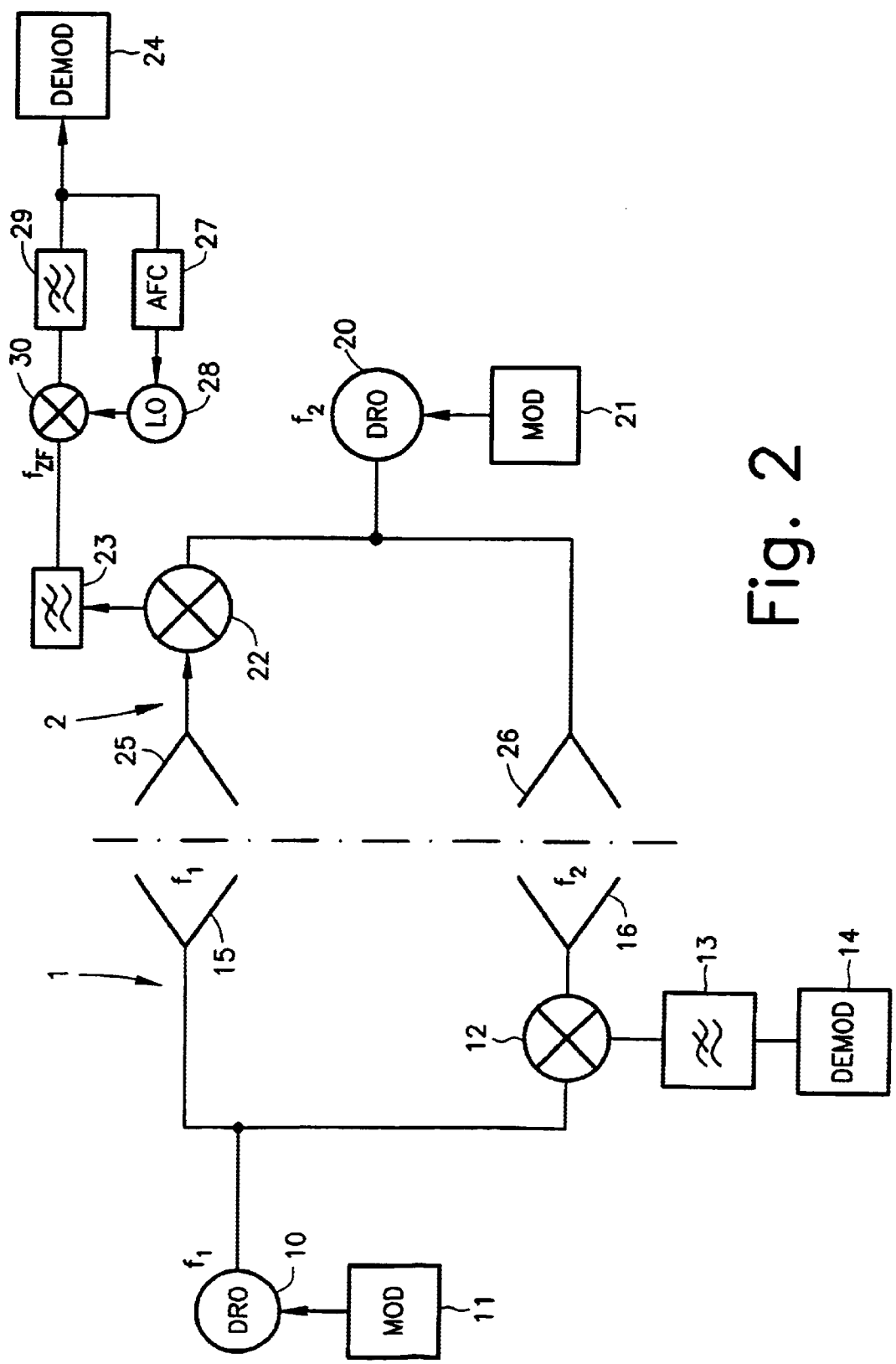
FIG. 2 shows a second exemplary embodiment in the form of a block diagram in which the intermediate frequency, which fluctuates due to the frequency drift of the DRO, is compensated by the fact that a variable LO signal is generated in the receiving branch and downmixes the intermediate frequency to a lower constant intermediate frequency.

On the vehicle side, the exemplary embodiment illustrated in FIG. 2 is identical to the exemplary embodiment described above and illustrated in FIG. 1. Only the reception part of second transceiver unit 2 in the transponder has been modified in comparison with the exemplary embodiment in FIG. 1. Intermediate frequency $f_{IF}$ which fluctuates due to the frequency drift of DROs 10, 20 is compensated according to FIG. 2 by the fact that it is not regulated but instead it is mixed down with a variable local oscillator signal $f_{LO}$ to a lower constant intermediate frequency $f_{IF2}$. To do so, a local oscillator 28, a mixer 30 and a low-pass filter 29 are used in addition.

Figures 3, 4:
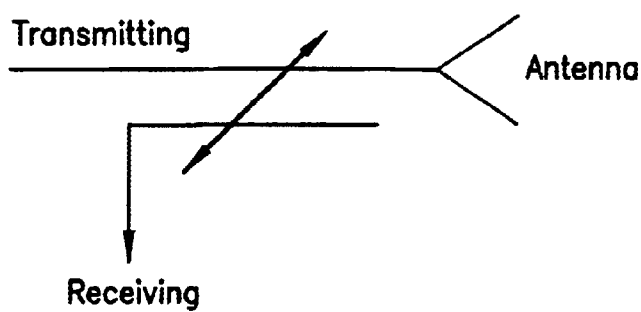
FIG. 3 shows in the form of a table the additional attenuation resulting due to a difference in polarization between the field and the antenna.
FIG. 4 shows a transmitting/receiving antenna including a directional coupler.

The problem in orientation of transmitting/receiving antennas 15, 16, 27, 26 of the first and second transceiver units is explained below on the basis of FIG. 3.

Copolarized antennas are normally used in wireless transmission systems on the transmitting and receiving sides and are usually linearly polarized. For example, if two dipoles are used, a maximum signal strength at the receiving dipole (attenuation 0 dB) is obtained with a parallel orientation. If the two dipoles are rotated 90° toward one another, the attenuation is (theoretically) infinitely great. These two cases are illustrated in the table in FIG. 3. However, since there is always some reflection in the vicinity of the antennas, a weak signal is nevertheless received in practice.

If one antenna is circularly polarized (circularly anticlockwise rotating or circularly clockwise rotating) and the other antenna is linearly polarized, then in the best case the signal attenuation amounts to 3 dB, depending on how the antenna is rotated in its plane perpendicular to the direction of the connection.

Both antennas should not be circularly polarized because if a non-omnidirectional antenna is oriented in the direction opposite that of the other antenna, reflection results in the direction of rotation of the circularly polarized waves being in the opposite direction, and the attenuation being (theoretically) infinitely great.

In a passive entry system made possible by the exemplary data transmission device according to the present invention, the position of the vehicle is assumed to be fixed in space, but there may be any desired orientation of the transponder to the vehicle, so a linear polarization should be used on one side and circular polarization on the other side. Therefore, it is not possible for the case of theoretically infinitely attenuation to occur. According to the present invention, the passive entry system is implemented in the microwave range. Then the high-frequency front end in the vehicle may be provided, for example, with a linearly polarized patch antenna, and an array of one or more circularly polarized patch antennas may be used in the key with the transponder to obtain the best omnidirectional characteristic.

In departure from the two implementations indicated schematically in FIGS. 1 and 2 in which one transmitting antenna each is provided separately from a receiving antenna on both sides of first and second transceiver units 1 and 2, also a monostatic implementation including a directional coupler may be used. Such an implementation is illustrated in FIG. 4. The receiving branch is connected to the transmitting branch via a directional coupler, and the transmitting/receiving antenna is common to both branches.

Figure 5:
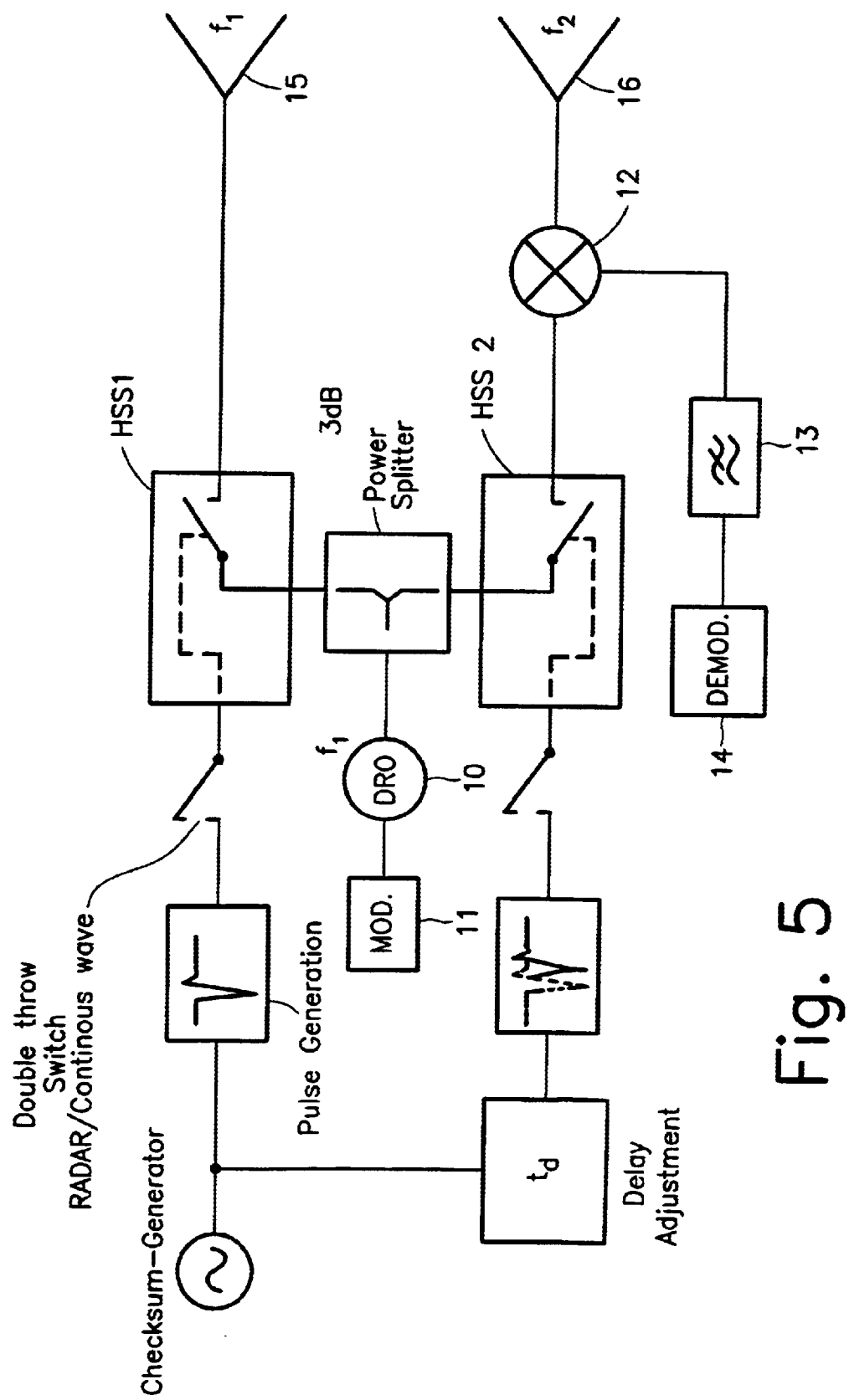
FIG. 5 shows a block diagram of the part of the data transmission device located in a vehicle, the data transmission device is integrated-into an existing automotive radar sensor.

FIG. 5 shows details of a data transmission device implemented on the vehicle side and combined with an existing automotive radar sensor. For the "data transmission" mode of operation, both high speed switches $HSS_1$ and $HSS_2$ are closed by being driven not by snap-off diodes but instead by a direct voltage. The other function blocks of the data transmission device are identical to the components of transceiver unit 1 of FIGS. 1 and 2.

The required AFC circuit (FIGS. 1 and 2) is integrated into the transponder, i.e., in second transceiver unit 2 in the key fob, in a beacon, etc., because this transceiver unit 2 in the transponder does not include a radar mode in which automatic. frequency control AFC would have to be shut down.

Due to the use of this combined radar/data transmission system, a cost reduction in production is achieved in comparison with previous separate systems, and furthermore, the reliability of transmission between the vehicle and the transponder is increased. Due to the implementation of the intermediate frequency common to both transceiver units, which may be processed using inexpensive standard components, the described exemplary data transmission device according to the present invention may be integrated easily and inexpensively into the existing automotive radar system.

What is claimed is:

1. A device for data transmission for at least one of in a first motor vehicle and from a second motor vehicle, comprising:
   a first transceiver unit located with the first motor vehicle, and being radar unit equipped for distance measurement that is expanded by adding a two-channel data transmission system;
   at least one transponder unit; and
   a second transceiver unit in the at least one transponder unit and being spatially positioned relative to the first motor vehicle one of arbitrarily and variably, the second transceiver unit being a two-channel data transmission unit;
   wherein microwave frequencies for two-channel communication are selected so that their difference yields an intermediate frequency that is processable in a heterodyne receiver in a reception part of each of the first transceiver unit and the second transceiver unit.

2. The data transmission device of claim 1, further comprising:
   at least one antenna for at least one of transmitting and receiving, being circularly polarized on a side of one of the first transceiver unit and the second transceiver unit, and being linearly polarized on a side of another one of the first transceiver unit and second transceiver unit.

3. The data transmission device of claim 2, wherein the at least one antenna is circularly polarized on a transponder side.

4. The data transmission device of claim 2, wherein the at least one antenna includes a spherical directional characteristic on a transponder side.

5. The data transmission device of claim 1, wherein the transponder unit is part of a vehicle key.

6. The data transmission device of claim 5, wherein the vehicle key is configured for keyless access to the first motor vehicle based on an identification signal transmitted by data transmission between the first motor vehicle and the at least one transponder unit.

7. The data transmission of claim 1, further comprising:
   a second transponder unit for one of telematic applications, acquiring fees, and remote control applications.

8. The data transmission device of claim 1, wherein the first transceiver unit and the second transceiver unit each include a transmitter and a receiver configured so that their transmission frequency is simultaneously used as a local oscillator frequency for a mixer that downmixes a receiving frequency in a reception case.

9. The data transmission device of claim 1, wherein a transmission frequency and a receiving frequency of both the first transceiver unit and the second transceiver unit are selected so that their frequency shift conforms to band limits of a used frequency band.

10. The data transmission device of claim 1, wherein the first transceiver unit and the second transceiver unit each include a microwave oscillator that includes a dielectric resonant oscillator.

11. The data transmission device of claim 1, wherein the first transceiver unit and the second transceiver unit each include a microwave oscillator that includes a voltage-controlled oscillator.

12. The data transmission device of claim 1, wherein a frequency drift is correctable by an AFC circuit in only one of the first transceiver unit and the second transceiver unit to maintain a constant intermediate frequency.

13. The data transmission device of claim 12, wherein the AFC circuit is provided only in the second transceiver unit.

14. The data transmission device of claim 1, wherein a fluctuation in an intermediate frequency caused by a frequency drift is compensated in only one of the first transceiver unit and the second transceiver unit, and the intermediate frequency is downmixed with a variable local oscillator signal to a lower constant intermediate frequency.

15. The data transmission device of claim 14, wherein a circuit for generating the variable local oscillator signal is provided only in the second transceiver unit.

16. The data transmission device of claim 1, wherein at least one of the first transceiver unit and the second transceiver unit includes a transmitting antenna and a separate receiving antenna.

17. The data transmission device of claim 1, wherein at least one of the first transceiver unit and the second transceiver unit includes a common antenna and a directional coupler for a transmitting/receiving branch.

18. The data transmission device of claim 1, wherein each of the first transceiver unit and the second transceiver unit include a frequency shift keying modulator.

19. The data transmission device of claim 1, wherein each of the first transceiver unit and the second transceiver unit include an amplitude shift keying modulator.

20. The data transmission device of claim 1, wherein each of the first transceiver unit and the second transceiver unit include a phase shift keying modulator.

* * * * *

UNITED STATES PATENT AND TRADEMARK OFFICE
CERTIFICATE OF CORRECTION

PATENT NO.   : 6,693,581 B2
DATED        : February 17, 2004
INVENTOR(S)  : Frank Gottwald et al.

It is certified that error appears in the above-identified patent and that said Letters Patent is hereby corrected as shown below:

Column 4,
Line 62, change "automatic. frequency control" to -- automatic frequency control --

Column 5,
Line 1, change "the implementat ion" to -- the implementation --

Signed and Sealed this

Fifteenth Day of February, 2005

JON W. DUDAS
*Director of the United States Patent and Trademark Office*